P. N. GEIGER.
SHAFT COUPLING.
APPLICATION FILED OCT. 25, 1918.
1,429,580.
Patented Sept. 19, 1922.
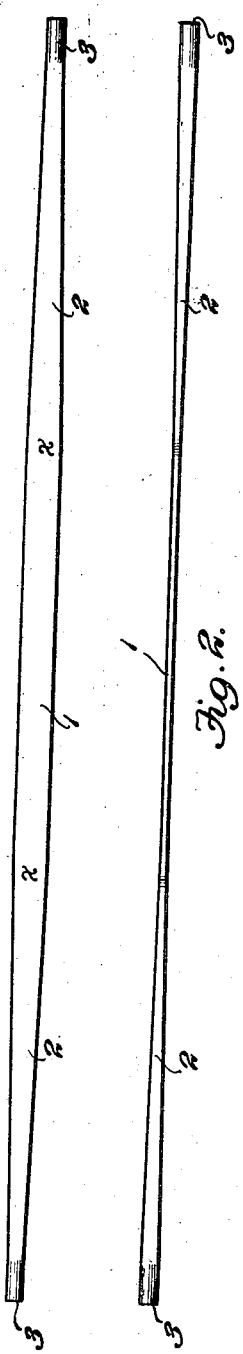
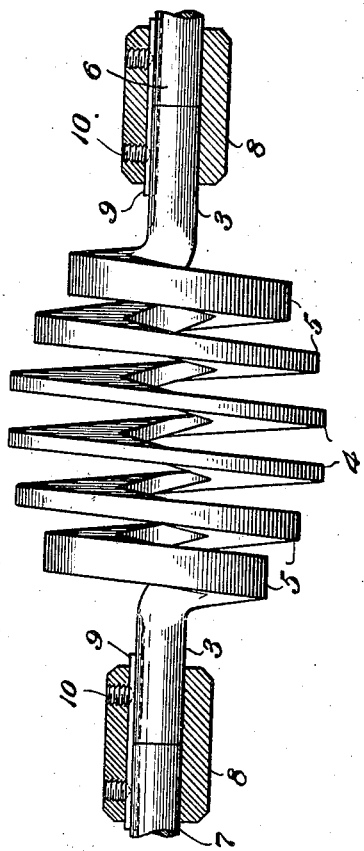
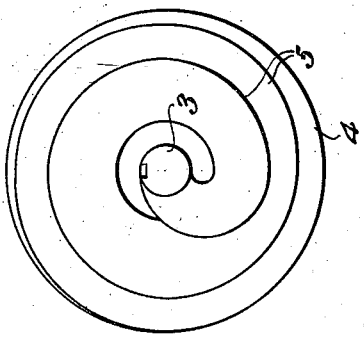
INVENTOR
Paul Neal Geiger,
By Freese, Merkel, Saywell & Bond
ATTORNEYS.

Patented Sept. 19, 1922.

1,429,580

UNITED STATES PATENT OFFICE.

PAUL NEAL GEIGER, OF MASSILLON, OHIO.

SHAFT COUPLING.

Application filed October 25, 1918. Serial No. 259,705.

*To all whom it may concern:*

Be it known that I, PAUL NEAL GEIGER, a citizen of the United States, residing at Massillon, in the county of Stark and State of Ohio, have invented certain new and useful Improvements in Shaft Couplings. of which the following is a specification.

The invention relates to couplings for shafts which may not be maintained in axial alinement; and the object of the improvement is to provide flexible means for connecting a driving shaft with a driven shaft, which will compensate for angular or offset variations in their axes, which may be slightly compressed or expanded for longitudinal adjustment, and which will have a torsional strength substantially equal to that of the connected shafts.

These objects are attained by forging a round bar of spring steel so that a middle portion of the bar will be flattened to a uniform width with adjacent portions flattened to a width tapering from the middle portion to the round end portions of the bar, and then coiling the flattened portions of the bar edgewise to form a cylindrical spiral of the middle section and conical spirals of the tapered portions, from which the round end portions are extended in the axes of the coils for joining with the adjacent ends of the driving and driven shafts.

A preferred embodiment of the invention is illustrated in the accompanying drawings forming part hereof, in which—

Figure 1 is a plan view of a round bar having its middle portions flattened to form the coupling;

Fig. 2, an edge view of the same;

Fig. 3, a side elevation of the improved coupling formed from the bar shown in Figs. 1 and 2; and Fig. 4 an end view of the same.

Similar numerals refer to similar parts throughout the drawings.

The flexible coupling is made of a bar of spring steel which may be round and is preferably of substantially the same diameter as the diameter of the shafts to be connected. As shown in Figs. 1 and 2 the bar is forged to form the middle portion 1 of uniform width and thickness and the intermediate portions 2 tapered in width and thickness to the round end portions 3 of the bar.

The middle portion 1 of the bar may be flattened to a thickness of about one-third of the original diameter of the bar, and to a width of about two and one-third times the original diameter thereof, and the intermediate portions 2 are tapered uniformly in width and thickness to the round portions 3 at the ends of the bar.

The middle portion of the bar is preferably formed or forged without materially extending the length thereof, and at any event, the bar is formed so that the cross sectional area is substantially uniform throughout its extent.

The bar thus formed is then helically coiled edgewise in such a manner as to form a cylindrical spiral 4 of the middle portion of the bar with a uniform width and thickness, and a conical spiral 5 of the intermediate portions of the bar which have a tapered width and thickness; from the ends of which spirals the round end portions 6 of the bar extend in opposite directions in the axis of the coil.

The axial ends 3 of the coupling thus formed may be joined to a driving shaft 6 and a driven shaft 7 in any suitable manner, as by means of the sleeve couplings 8 which may be secured by shrinking thereon as well as by keys 9 and set screws 10.

By thus flattening the middle coils of the spiral to increase the radial width thereof, the metal therein is disposed of in such a manner as to give the coupling a sufficient lateral flexibility for the purposes of the invention while maintaining substantially the same torsional strength as the round axial ends thereof; and at the same time the coupling as a whole may be slightly compressed or expanded to meet the varying requirements and conditions of use.

Although the cylindric spiral portion shown in the drawings comprises two complete coils, it will be understood that the number of coils in this portion of the coupling can be increased or decreased to meet the varying requirements of use; and likewise that the conical spiral coils made of the tapered portion of the bar may likewise be made of varying numbers of coils; and it will also be understood that the proportions of the different parts of the coupling may be varied as desired.

And finally, it will be understood that the axial ends of the coupling herein described may be extended to constitute shafts of greater or less length, so that the coupling may be referred to as a flexible section of a shaft bar.

I claim:—

1. A rotatable shaft coupling comprising a helical body and integral axial ends having a cross section like the shaft, the helical body tapering from a substantially square section at each end to an increased radial width and a decreased thickness intermediate the ends.

2. A rotatable shaft coupling comprising a helical body and integral axial ends having a cross section like the shaft, the coils being flattened to decrease the thickness and correspondingly increase the radial width thereof.

3. A rotatable shaft coupling comprising a body coiled as a cylindrical spiral between two conical spirals with integral axial ends.

4. A rotatable shaft coupling comprising a body coiled as a cylindrical spiral between two conical spirals with integral axial ends having a cross section like the shaft.

5. A rotatable shaft coupling comprising a body coiled as a cylindrical spiral between two conical spirals, the coils being flattened to decrease the thickness and correspondingly increase the radial width thereof.

6. A rotatable shaft coupling comprising a body coiled as a cylindrical spiral between two conical spirals with integral axial ends, the coils being flattened to decrease the thickness and correspondingly increase the radial width thereof.

7. A rotatable shaft coupling comprising a body coiled as a cylindrical spiral between two conical spirals, the coils being flattened to decrease the thickness and correspondingly increase the radial width thereof, and being of substantially uniform cross area throughout.

8. A rotatable shaft coupling comprising a coiled body and integral axial ends, the coils being flattened to decrease the thickness and correspondingly increase the radial width thereof and the cross area of the coils and ends being substantially uniform throughout.

9. A rotatable shaft coupling comprising a body coiled as a cylindrical spiral between two conical spirals with integral axial ends, the coils being flattened to decrease the thickness and correspondingly increase the radial width thereof and the cross area of the coils and ends being substantially uniform throughout.

10. A rotatable shaft coupling made of a spring steel bar flattened intermediate its ends and coiled edgewise of its flattened portion to form a spiral body and integral axial ends.

11. A shaft coupling made of a spring steel bar flattened intermediate its ends and coiled edgewise of its flattened portion to form a spiral body and integral axial ends, with a substantially uniform cross area throughout.

12. A shaft coupling made of a spring steel bar flattened between its end portions to form a middle portion of uniform width between intermediate portions of tapered widths, and coiled edgewise of its flattened portions to form a cylindrical spiral and intermediate conical spirals between axial ends.

13. A shaft coupling made of a spring steel bar flattened between its end portions to form a middle portion of uniform width between intermediate portions of tapered widths, and coiled edgewise of its flattened portions to form a cylindrical spiral and intermediate conical spirals between axial ends, with a substantially uniform cross area throughout.

14. A rotatable shaft bar made of spring steel having a portion flattened and coiled edgewise to form an integral flexible spiral section intermediate the axial ends of the bar.

15. A rotatable shaft bar made of spring steel having a portion flattened and coiled edgewise to form an integral flexible spiral section intermediate the axial ends of the bar, with a substantially uniform cross area throughout.

PAUL NEAL GEIGER.